US012694509B2

(12) United States Patent
Rendahl et al.

(10) Patent No.: US 12,694,509 B2
(45) Date of Patent: Jul. 28, 2026

(54) APPARATUS AND METHOD FOR CLASSIFYING TIMBER LOGS

(71) Applicant: TRACY OF SWEDEN AB, Virserum (SE)

(72) Inventors: Jan Erik Rendahl, Virserum (SE); Jonny Edvardsson, Virserum (SE); Björn Lundsten, Grimslöv (SE)

( * ) Notice: Subject to any disclaimer, the term of this patent is extended or adjusted under 35 U.S.C. 154(b) by 243 days.

(21) Appl. No.: 18/716,980

(22) PCT Filed: Dec. 6, 2022

(86) PCT No.: PCT/IB2022/061831
§ 371 (c)(1),
(2) Date: Jun. 6, 2024

(87) PCT Pub. No.: WO2023/105408
PCT Pub. Date: Jun. 15, 2023

(65) Prior Publication Data
US 2025/0045910 A1 Feb. 6, 2025

(30) Foreign Application Priority Data

Dec. 7, 2021 (SE) .................................... 2130345-8

(51) Int. Cl.
*G06T 7/00* (2017.01)
*G06V 10/764* (2022.01)

(52) U.S. Cl.
CPC ............ *G06T 7/001* (2013.01); *G06V 10/764* (2022.01); *G06T 2207/20216* (2013.01); *G06T 2207/30161* (2013.01); *G06V 2201/06* (2022.01)

(58) Field of Classification Search
CPC .............................. G06T 7/001; G06V 10/764
See application file for complete search history.

(56) References Cited

U.S. PATENT DOCUMENTS

2004/0057551 A1 3/2004 Skatter et al.
2006/0260718 A1 11/2006 Neglay et al.
(Continued)

FOREIGN PATENT DOCUMENTS

AU 2011202897 A1 1/2012
CA 2494012 A1 1/2006
(Continued)

OTHER PUBLICATIONS

International Preliminary report on Patentability issued for International Patent Application PCT/IB2022/061831, on Jun. 20, 2024, 07 Pages.
(Continued)

*Primary Examiner* — Edward Park
(74) *Attorney, Agent, or Firm* — RC Trademark Company

(57) ABSTRACT

Disclosed is an apparatus and method configured for classifying timber logs in a wood processing chain. The apparatus comprises an image processor. The image processor is configured to receive a first log image of a first end of log and determine a first end pattern. The image processor is configured to receive a second log image of a second end of the same log, wherein the second end is opposite the first end. The image processor is further configured to determine a first pattern in the first end and a second pattern in the second end. Lastly, the image processor is further configured to determine a characteristic of the log based on the first pattern and the second pattern.

19 Claims, 8 Drawing Sheets

(56)     References Cited

U.S. PATENT DOCUMENTS

2010/0332438 A1      12/2010  Toland
2018/0313809 A1 *   11/2018  Ursella  ................. G01N 33/46
2020/0066034 A1 *    2/2020  Tham  ..................... G01C 15/00
2023/0024974 A1 *    1/2023  Rendahl  ................. B27B 1/007
2025/0045910 A1 *    2/2025  Rendahl  .............. G06V 10/764

FOREIGN PATENT DOCUMENTS

JP         2004330594  A     11/2004
JP         2006226950  A      8/2006
SE            517036  C2      4/2002
WO           0072652  A2     12/2000
WO           0079213  A1     12/2000
WO          02068899  A2      9/2002
WO        2005080949  A1      9/2005
WO        2016024242  A1      2/2016
WO        2018132058  A1      7/2018
WO        2019097456  A1      5/2019
WO        2021064622  A1      4/2021

OTHER PUBLICATIONS

International Search Report and Written Opinion issued for International Patent Application PCT/IB2022/061831, on Mar. 16, 2023, 10 Pages.
Office Action issued for Swedish Application SE 2130345-8, on Jun. 8, 2022 , 09 Pages.
Office Action issued for Swedish Application SE 2130345-8, on Dec. 16, 2022 , 08 Pages.

\* cited by examiner

FIG. 4A                    FIG. 4B
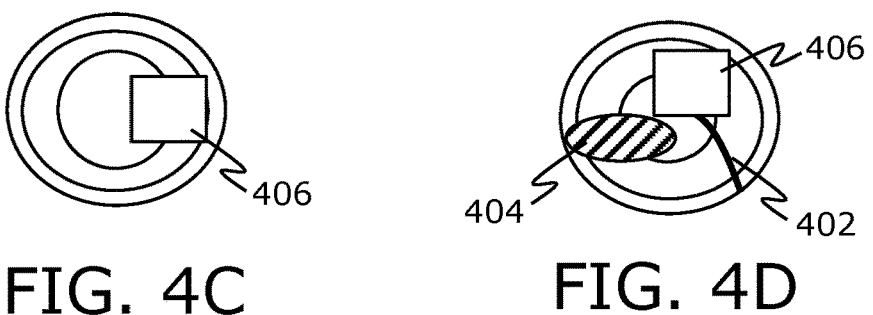
FIG. 4C                    FIG. 4D
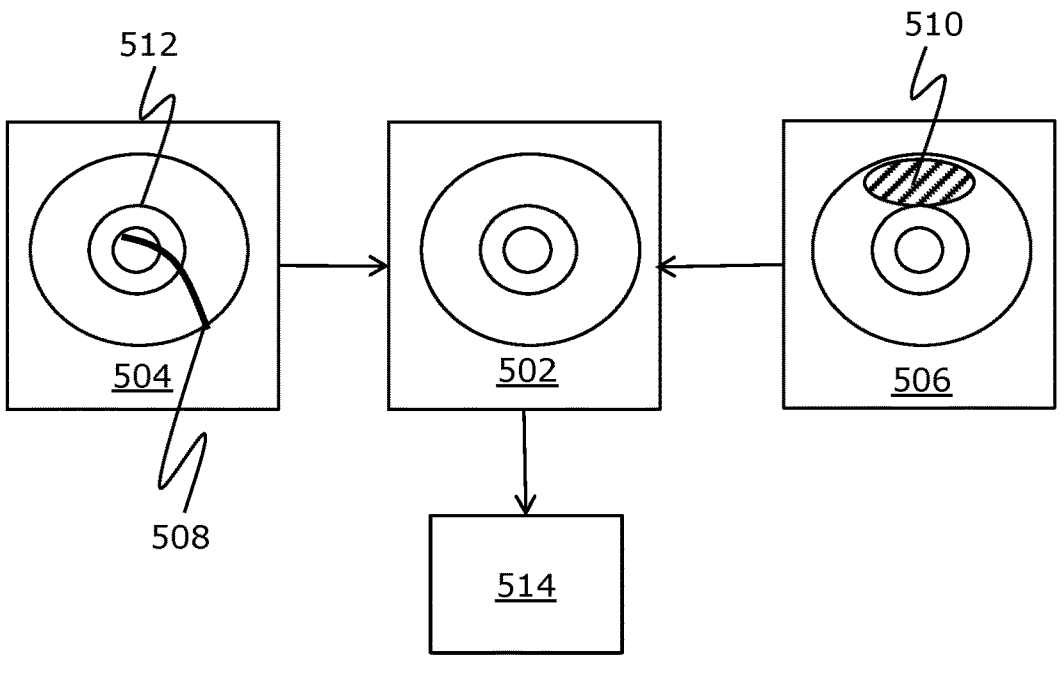
FIG. 5

APPARATUS AND METHOD FOR CLASSIFYING TIMBER LOGS

TECHNICAL FIELD

The present disclosure relates generally to wood processing chain; and more specifically, to apparatus and methods for classifying timber logs in a wood processing chain.

BACKGROUND

In the recent past, the log export industry in many countries is required to count and barcode every log that is exported. Additionally, after harvest, logs for export are typically delivered to a port on logging trucks or trailers. Moreover, upon arrival at the port, the load of logs on each truck is processed at a checkpoint or processing station. Typically, the number of logs in each load is classified and various measurements on each individual log are conducted to scale for volume and value, before being loaded onto ships for export.

Notably, the log classification and scaling exercise is currently very labour intensive as it requires one or more log experts per logging truck to classify and scale each log manually. Moreover, the log classification and scaling exercises can cause a bottleneck in the supply chain of the logs from the forest to the ship for export, or for supply to domestic customers.

In recent times, to address the above issue various automated systems have been proposed for assisting in automatic methods and measurement of logs. However, many of these currently proposed systems have various drawbacks which have limited their widespread adoption by the log export industry. Notably, one such automated system is a drive-through log measuring system for log loads on logging trucks. Additionally, the system comprises a large structure mounting an array of lasers about its periphery and through which a logging truck may drive through. Moreover, the system laser scans the log load on the back of the truck as it drives through and generates a 3D model of the log load. Furthermore, the 3D model is then processed to extract various characteristics of the logs, such as log diameters. However, this type of system is typically very large and expensive.

Therefore, in light of the foregoing discussion, there exists a need to overcome the aforementioned drawbacks associated with the conventional techniques and systems for classifying timber logs in a wood processing chain.

SUMMARY

The present disclosure seeks to provide an apparatus configured for classifying timber logs in a wood processing chain. The present disclosure also seeks to provide a method configured for classifying timber logs in a wood processing chain. An aim of the present disclosure is to provide a solution that overcomes at least partially the problems encountered in prior art.

In one aspect, the present disclosure provides an apparatus configured for classifying timber logs in a wood processing chain, wherein the apparatus comprises an image processor, wherein the image processor is configured to: receive a first log image of a first end of log and determine a first end pattern; receive a second log image of a second end of the same log, wherein the second end is opposite the first end; determine a first pattern in the first end; determine a second pattern in the second end; and determine a characteristic of the log based on the first pattern and the second pattern.

In some embodiments, the image processor is further configured to determine that there is a difference in the first and the second pattern, and in response thereto: determine that the corresponding log has been subjected to a growth issue; and determine that the characteristic indicates a quality factor.

Beneficially, such an arrangement allows the image processor to compare a first log end with its corresponding log end pair. Additionally, the difference in the first end and the second of the log images indicates if the log is not uniform throughout the length thereof. Notably, lesser the difference, the more uniform the log is and hence, better the quality of the log. Consequently, more the difference, indicates a non-uniform log and hence, lower the quality of the log.

In some embodiments, the apparatus according to any previous claim, wherein the image processor is further configured to receive the one or more first and one or more second log images by: receiving a first load image and a second load image, wherein the first load image is an image of a load of logs from a first direction showing one end of the logs, and the second load image is an image of at least a portion of the load of logs in a second direction showing the opposite end of the logs; segmenting each load image to obtain a plurality of log images, wherein each of the plurality of log images for the first load image comprises an image of a first end of at least one log and each of the plurality of log images for the second load image comprises an image of a second end of at least one timber log; and comparing the plurality of log images for the first load to the plurality of log images for the second load based on year-ring patterns, whereby a matching pair of log images constitute a first and a second log image.

This enables for a wide variety of qualifiers to be determined for a load of logs at one and the same time, for example as the load is being brought into a saw mill, before it is loaded on to a truck, or offloaded a truck, or when the load is lying in a pile. Such qualifiers include the identity of individual logs, and also quality factors of logs. As logs from a same site have been exposed to the same environmental factors, some indicators that may be difficult to identify or detect in a single log, may be detected more accurately based on a trend in the logs of the same pile or load.

As such, handling a number of logs at once enables for a more accurate analysis of some quality indicators. For example, a single log exhibiting a slight discoloration (possibly in a spot) may not be a strong enough indicator of a condition of the log, but as logs felled at a same time or location will often suffer from the same diseases and other ailment, a same discoloration, however slight, appearing in many logs in the same pile may be an indicator of a common disease or ailment, that possibly could have been missed if only a single log was examined.

In some embodiments, the apparatus is operatively connected to a data base arrangement comprising prestored patterns for logs, each pattern being associated with an individual log, and wherein the image processor is configured to match at least one of the first and second images to the plurality of pre-stored images to identify the individual log. Beneficially, the image processor uses both the first and the second image for comparison. Furthermore, using two images increases the chances of getting a perfect match to identify individual logs.

In some embodiments, the image processor is configured to match the plurality of log images in two load images to identify corresponding pairs of log images in the two load images, the corresponding pair of log images being of a same log of different ends, prior to comparing at least one of the images in each of the identified corresponding pair of log images to the plurality of pre-recorded images in the database arrangement, wherein a pair is compared pairwise to the reference images.

Beneficially, the logs may thereby be analysed individually or in unison in order to detect similarities between the logs indicative of quality factors. This increases the likelihood of a successful match with the prestored images in the data base arrangement. Moreover, comparing the log end pairs generate a more detailed image of the log end that can be further compared with the prestored image Beneficially, as the images of both the ends of a log may be defaced differently, supplementing log ends result in a cleaner image.

In some embodiments, the apparatus is configured to utilize an artificial intelligence module to identify the characteristic based on the first and second patterns for a log, possibly also based on patterns for other logs.

In another aspect, the present disclosure provides a method configured for classifying timber logs in a wood processing chain, wherein the method comprises: receiving a first log image of a first end of log by a processor and determining a first end pattern; receiving a second log image of a second end of the same log, wherein the second end is opposite the first end; determining a first pattern in the first end; determining a second pattern in the second end; and determining a characteristic of the log based on the first pattern and the second pattern.

Embodiments of the present disclosure substantially eliminate or at least partially address the aforementioned problems in the prior art, and enable efficient and accurate classification of timber logs.

In some embodiments, the method further comprises receiving the one or more first and one or more second log images by: receiving a first load image and a second load image, wherein the first load image is an image of a load of logs from a first direction showing one end of the logs, and the second load image is an image of at least a portion of the load of logs in a second direction showing the opposite end of the logs; segmenting each load image to obtain a plurality of log images, wherein each of the plurality of log images for the first load image comprises an image of a first end of at least one log and each of the plurality of log images for the second load image comprises an image of a second end of at least one timber log; and comparing the plurality of log images for the first load to the plurality of log images for the second load based on year-ring patterns, whereby a matching pair of log images constitute a first and a second log image.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 4A-4D illustrate an exemplary implementation of various defaced log ends, in accordance with an embodiment of the present disclosure;

FIG. 5 illustrate an exemplary implementation of comparing two log ends, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an apparatus configured for classifying timber logs in a wood processing chain, wherein the apparatus comprises an image processor, wherein the image processor is configured to: receive a first log image of a first end of log; receive a second log image of a second end of the same log, wherein the second end is opposite the first end; determine a first pattern in the first end; determine a second pattern in the second end; and determine a characteristic of the log based on the first pattern and the second pattern.

In another aspect, an embodiment of the present disclosure provides a method configured for performing the function of such an apparatus.

The present disclosure provides an improved apparatus and method to classify timber logs in the wood processing chain. Furthermore, the present disclosure processing of images comprising a plurality of logs in an efficient and accurate manner. Such bulk processing significantly improves processing times of log trucks during classification and labelling stage. Beneficially, the present disclosure matches two ends of a log in a load or pile of logs to complete a log end pair. In some embodiments, the disclosed apparatus detects any cut, dirt, rot, or other defacing on log ends and. Moreover, the present disclosure is capable of calculating the actual usable volume of the log and therefore also of the pile or load.

As will be discussed herein, in some embodiments, the images of the first and second logs originate from each an (one or more) image of a load (or pile) of logs.

Figure 1:
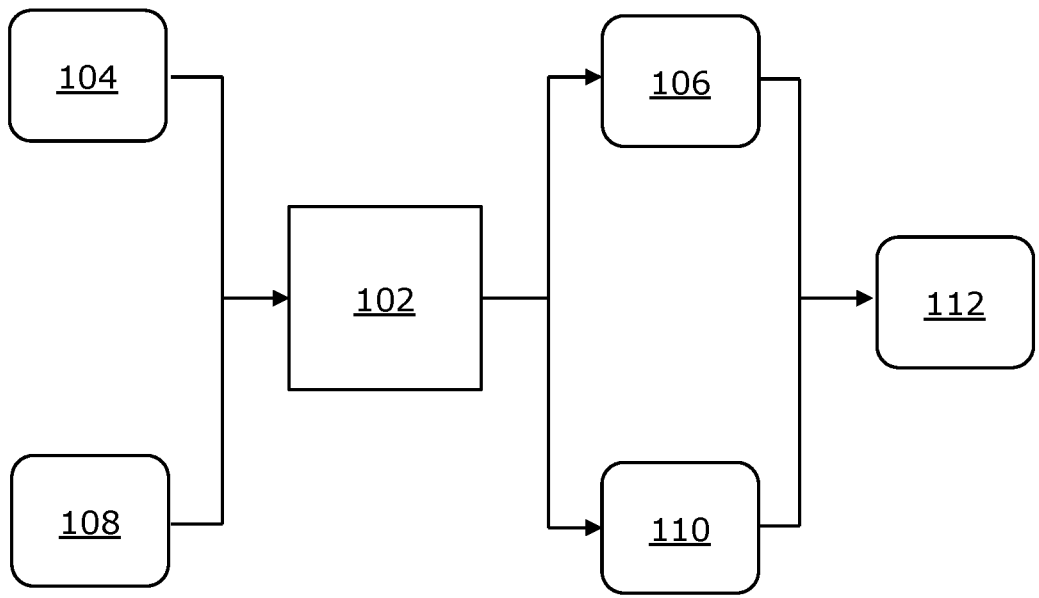
FIG. 1 is a block diagram of an apparatus to classify timber logs in a wood processing chain, in accordance with an embodiment of the present disclosure.

Referring to FIG. 1, there is shown a block diagram of an apparatus for classifying timber logs in a wood processing chain, in accordance with an embodiment of the present disclosure. The apparatus comprises an image processor 102. The image processor 102 is configured to receive a first log image 104 of a first end of log and determine a first end pattern 106. The image processor 102 is further configured to receive a second log image 108 of a second end of the same log. The second end is opposite the first end. The image processor 102 is further configured to determine a first pattern 106 in the first end. Additionally, the image processor 102 is configured to determine a second pattern 110 in the second end. Moreover, the image processor 102 is configured to determine a characteristic 112 of the log based on the first pattern 106 and the second pattern 110.

In some embodiments, the image is stored as an image. In some embodiments, the image is stored as a representation of the image, a pattern or other component in the image.

Throughout the present disclosure, the term "log" refers to a partial or complete portion of a tree, the log being employed for making various wood-based products. Typically, the log is cylindrical in shape and has a first end and a second end. Generally, each of the first end and the second end of the log is generally circular in shape. Throughout the present disclosure, the term "wood processing chain" herein refers to a sequence of events involved for producing the wood-based products such as furniture, doors, toys, boats, ladder and the like. The wood processing chain comprises events such as felling of trees from a desired and/or designated land such as a forest, separating branches from the trees, making logs from the trees, sorting the logs, storing the logs, and processing the logs to produce the wood-based products. Specifically, the wood processing chain comprises a harvesting stage, a sorting stage, a buffer storage stage, and a sawmill stage.

Herein, the term "image processor" 102 refers to an image processing engine or an image processing unit that can perform quantitative measurements of counts, length, duration, and thus can be used to analyse and process at least one of the received images. Additionally, the image processor 102 may comprise software programs for creating and managing one or more processing tasks. Moreover, the image processor performs noise reduction, object detection, extraction, and the likes. Optionally, the image processor 102 is communicably coupled to at least one camera via a network to receive images captured by the at least one camera. Herein, a network may be a radio network, a local area network (LAN), wide area network (WAN), Personal Area Network (PAN), Wireless Local Area Network (WLAN), Campus Area Network (CAN), Metropolitan Area Network (MAN), storage-Area Network (SAN), and the likes.

Notably, the first log image 104 is taken from a first side of the log. Moreover, the first side may be either side of the log ends. Furthermore, the first log image 104 and the second log image 108 may be a still image or one or more frames in a video sequence.

As is discussed herein, in some embodiments, the first and second log images originate from each an image of a load (or pile) of logs.

Figure 2:
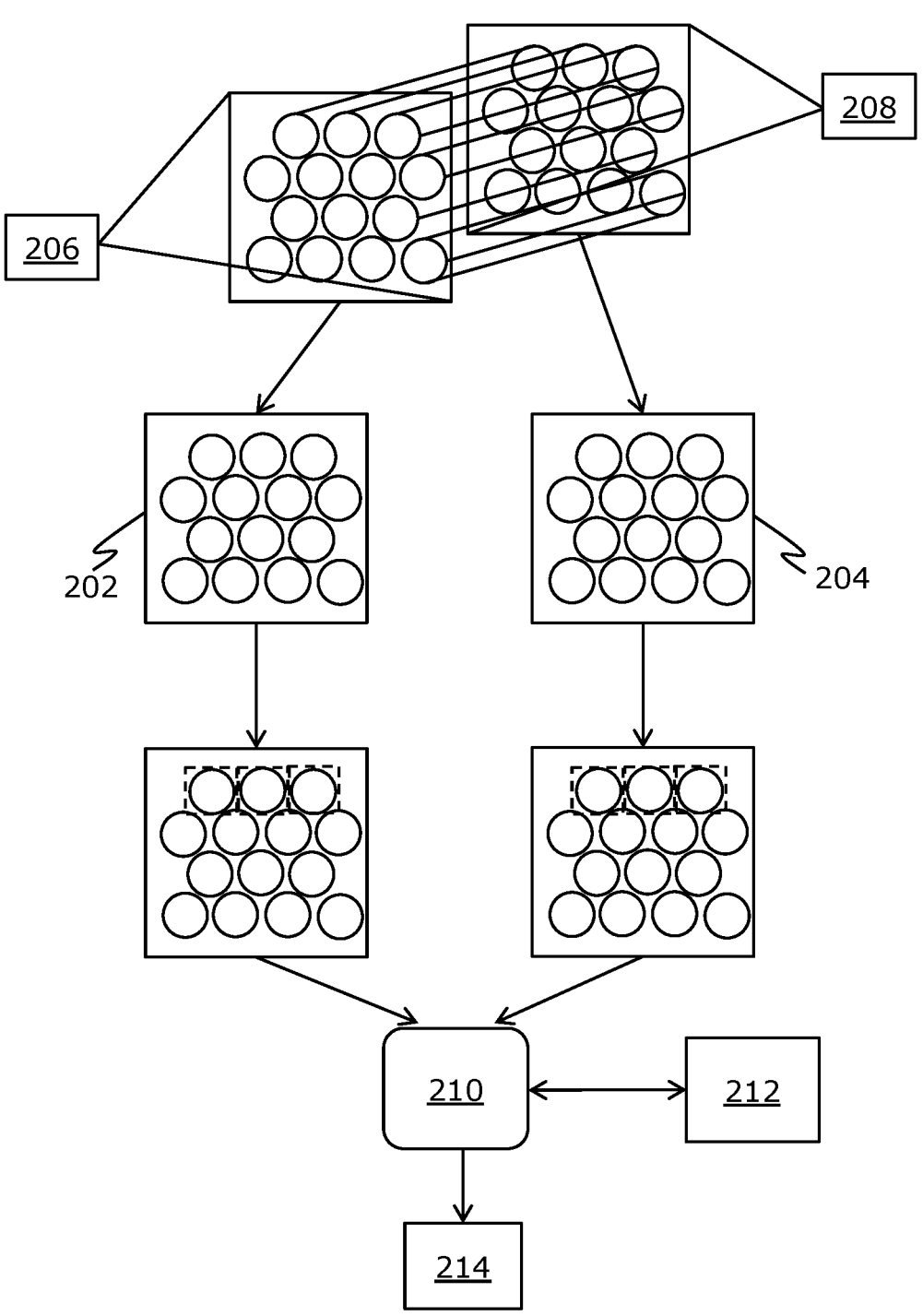
FIG. 2 illustrates steps of image processing by an image processor, in accordance with an embodiment of the present disclosure.

Referring to FIG. 2, illustrated are steps of image processing by an image processor, in accordance with an embodiment of the present disclosure. The image processor (not shown) is configured to receive a first load image 202 and a second load image 204. The first load image 202 is an image of at least a portion of logs from a first direction showing one end of the logs, and the second load image 204 is an image of at least a portion of the load of logs in a second direction showing the opposite end of the logs. In some embodiments, the first load image 202 is taken by a first camera 206 and the second load image 204 is taken by a second camera 208. In some embodiments, the first load image 202 is taken by a camera 206 and the second load image 204 is taken by the same camera 208. In some embodiments, either (or both) of the first load images 202, 204 is taken as a series of images, possibly as a video sequence. This enables a camera to scan a load as it is transported into or out of an area.

The image processor is configured to segment each of the load images to obtain a plurality of log images (shown by dotted lines). The plurality of log images for the first load image 202 comprises an image of a first end of at least one log. Additionally, the plurality of log images for the second load image 204 comprises an image of a second end of at least one log. Furthermore, the image processor is configured to compare, at a step 210, the plurality of log images of the first load image 202 with the plurality of log images of the second load image 204. The comparison, at step 210, is done, in one embodiment, based on year-ring patterns of the logs.

Optionally, in this regard, the term "load" refers to a group of logs waiting to be loaded or are already loaded or unloaded. Furthermore, the load may be on a truck/vehicle or a pile of logs at a felling site or other storage site. Notably, each of the load image contains a group of logs. Additionally, for better and faster processing, each of the load images are segmented into a plurality of log images. Moreover, each of the plurality of segmented images contains at least one log end. Furthermore, the plurality of log images from the first load image 202 are compared, at a step 210, with the plurality of log images from the second load image 204. Moreover, a successful match determines the first log end and its corresponding second log end. Notably, the comparison is based on year-ring patterns of the log ends.

In this regard, the first log image 104 and the second log image 108 is in some embodiments, of a group (such as a load or a pile) of logs. In such embodiments, the image processor 102 is thus further configured to receive the first log image 104 and second log images 108 by: receiving a first load image 202 and a second load image 204, wherein the first load image 202 is an image of a load of logs from a first direction showing one end of the logs, and the second load image 204 is an image of at least a portion of the load of logs in a second direction showing the opposite end of the logs; segmenting each load image to obtain a plurality of log images (shown by dotted lines), wherein each of the plurality of log images for the first load image 202 comprises an image of a first end of at least one log and each of the plurality of log images for the second load image 204 comprises an image of a second end of at least one timber log; and comparing, at a step 210, the plurality of log images for the first load end to the plurality of log images for the second load end based on year-ring patterns, whereby a matching pair of log images constitute a first and a second log image.

Optionally, and as discussed above, in this regard, images received by the image processor 102 may be from remote cameras, such as cameras 206, 208, or from a same camera, through a communication interface or from an internal camera. Herein, "communication interface" refers to a wired interface or a wireless interface. Additionally, wired interface may include, but is not limited to, cables, wires. Moreover, wireless network may include a radio network, a local area network (LAN), wide area network (WAN), Personal Area Network (PAN), Wireless Local Area Network (WLAN), Campus Area Network (CAN), Metropolitan Area Network (MAN), storage-Area Network (SAN), and the likes.

Figures 3A, 3B, 3C:
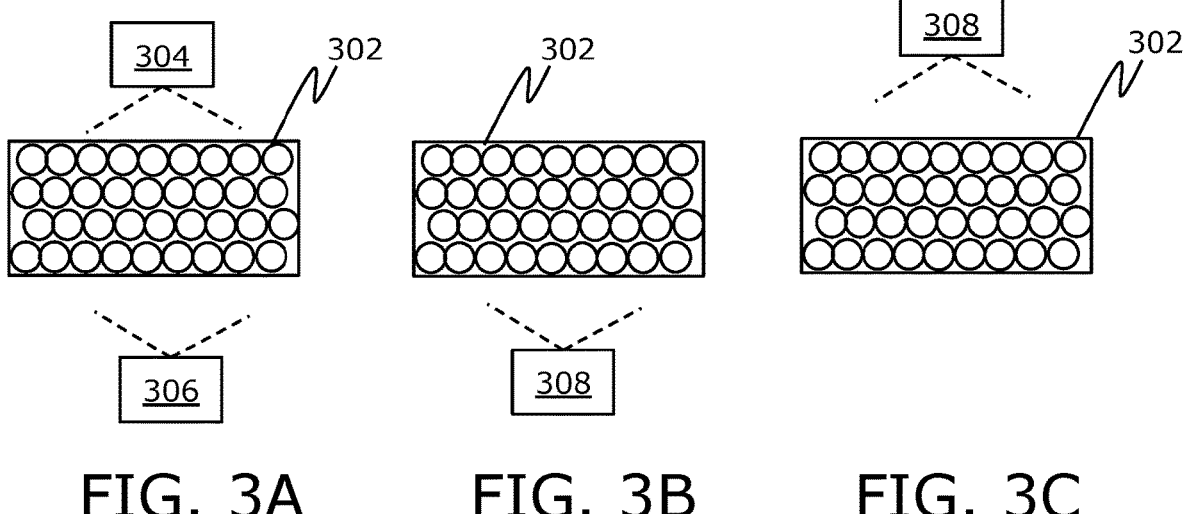
FIGS. 3A-3H illustrate an exemplary implementation of various position of cameras to take images of a load as well as different types of loads, in accordance with different embodiments of the present disclosure.

Referring to FIGS. 3A-3H, there are shown exemplary implementations of various position of cameras to take images of a load 302, and also different types of loads, in accordance with different embodiments of the present disclosure. In FIG. 3A, two cameras, such as cameras 304, 306 are used to take images of the load 302. The cameras, such as the cameras 304, 306 are fixed in such a way that they are opposite to one another and are facing the ends of the logs. In FIGS. 3B and 3C, one camera 308 is used to take image from one end of the load 302.

Figure 3D:
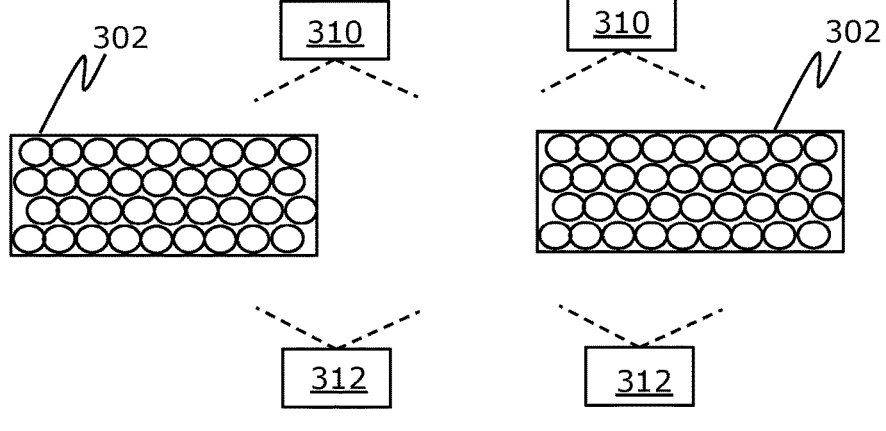

Additionally, the same camera 308 is repositioned to take the image from the other end of the load 302. In FIG. 3D, two cameras, such as cameras 310, 312 are stationary and fixed for example in the way of a vehicle carrying the load 302 passing by. The vehicle may be a truck in some embodiments. The vehicle may be a lumber ferry in some embodiments.

The cameras, such as cameras 310, 312, are positioned in some embodiments in such a way that the load 302 ends are visible to the cameras. Moreover, as the vehicle passes by, the cameras, such as the cameras 310, 312 take the images of the front end and the back end of the load. In some embodiments, the vehicle may have to manoeuvre in order to show both ends clearly. In some embodiments, the cameras (at least one of them), is movable arranged so that it can be maneuvered in order to achieve an image of an end.

Additionally, or alternatively, the camera 308 may be one or more handheld cameras, such as a digital camera (Digital Still Camera (DSC), cameras with fixed semi-transparent mirrors, also known as DSLT cameras, Digital Single-Lens Reflex cameras (DSLR) or otherwise), or as in a smartphone or a tablet, whereby an operator may manually capture the images of the load or pile. This allows an operator to simply capture an image of each side of a load and simultaneously analyse all logs in the pile in an improved manner, by the simple use of a smartphone (or other handheld camera). This can be done in the field before the pile is loaded, as the pile is loaded on a vehicle, as the load arrives to a processing or storage site, as the load is stored, or prior to the load being processed. Additionally, or alternatively, the camera 308 may be one or more cameras mounted in a drone (or other remote controlled vehicle (flying or otherwise), whereby an operator may capture the images of the log or pile by flying or otherwise maneuvering the drone to or along the two sides of the log or the pile. Additionally, or alternatively, the cameras, such as cameras 304, 306 may be mounted on a harvester or a loader at a loading bay of for example a sawmill or a transport depot. Furthermore, the cameras, such as cameras 310, 312 may be mounted at an entrance or exit of for example a sawmill (or other wood harvesting plant) or a transport depot.

Optionally, in this regard and as discussed briefly in the above, the load 302 images may be received as a scan of the load 302 as the load 302 passes by, or as a user walk along the load 302. Additionally, this allows for capturing images of logs as a truck carrying the load 302 passes by or as a user walk along the load 302 or a pile where there is not enough room to back away to frame the whole load 302 in one image. Moreover, the load images, may thus be one or more images or each at least a portion of a load 302 (potentially overlapping portions).

Figures 3E, 3F:
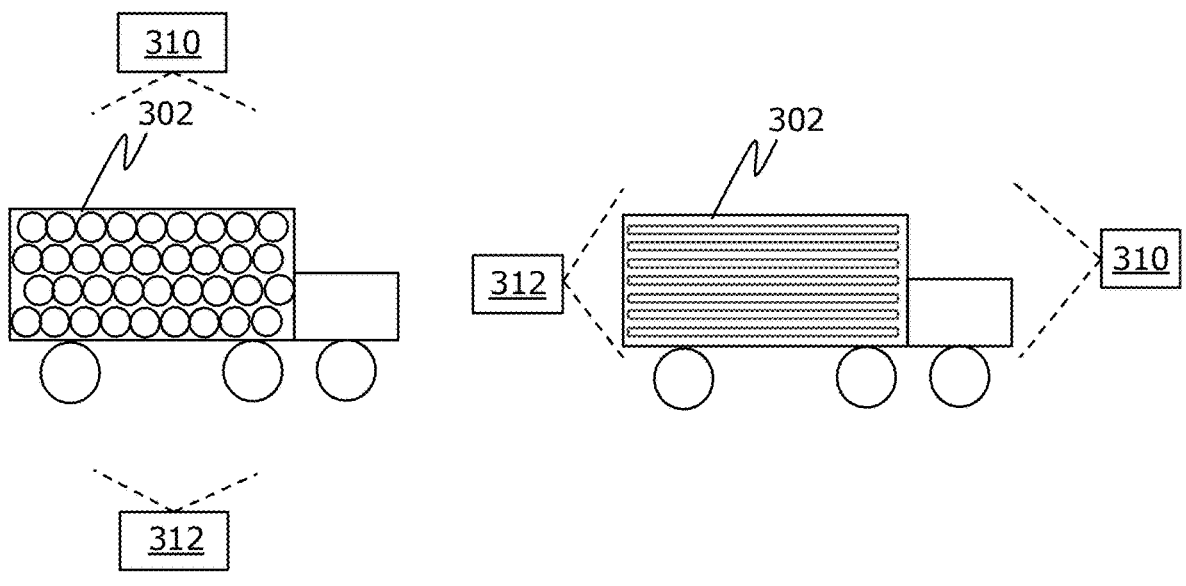
Figures 3G, 3H:
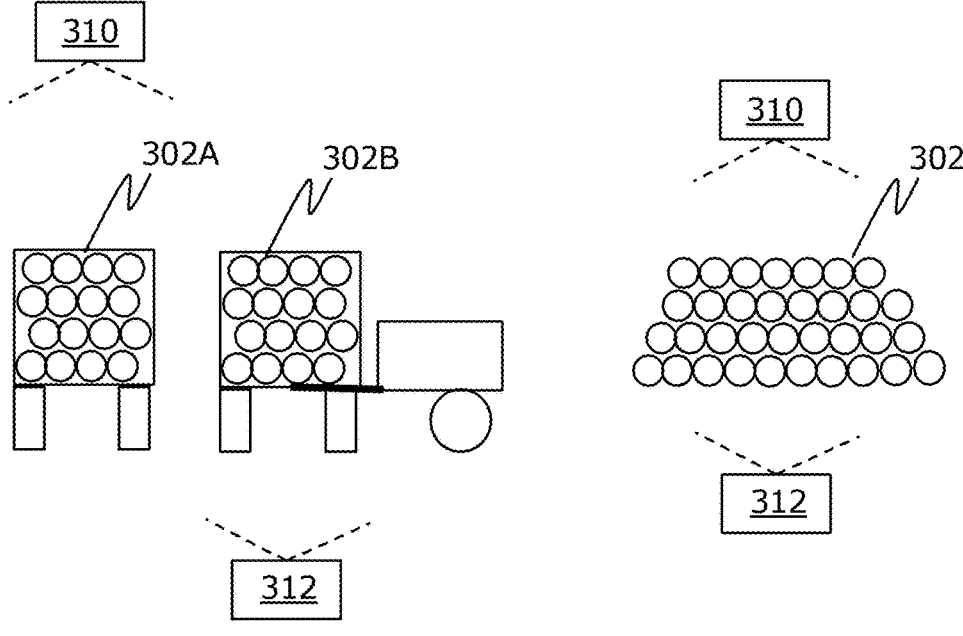

Referring to FIG. 3E one example of a load 302 is shown in the form of a load of logs on a vehicle, where the logs are loaded perpendicular to a direction of travel. Referring to FIG. 3F one example of a load 302 is shown in the form of a load of logs on a vehicle, where the logs are loaded parallel to a direction of travel. Referring to FIG. 3G one example of a load 302 is shown in the form of a load of logs on a vehicle, where the logs are loaded perpendicular to a direction of travel, and where it is illustrated how a first end 302A and a second end 302B of the load is shown and captured by a camera 310, 312 (a same or different cameras). In FIG. 3G it is shown how the truck may manoeuvre to show an end of the pile. In the example of FIG. 3G, the cabin of the truck has turned to its left, exposing the end. Referring to FIG. 3H one example of a load 302 is shown in the form of a pile of logs such as for storage of logs.

It should be noted that since there may be more than one pile at a site (in the field or at a processing or storage site), or—similarly—There may be more than one loads arriving at a same or similar time, and the various ends may be captured in an order or at times so similar that it is difficult to identify load image pairs based on the timing alone, the image processor may identify which of the first and second load end images that match or correspond to one another without further user input. Finding a single log that appears in two load images based on comparing for example year-ring patterns will produce a match of those two load images. In this respect, the image processor is thus configured to identify corresponding load image pairs comprising the first and the second load end images. Furthermore, the image processor may also, in some embodiments, be able to sort out duplicates by excluding load images that show an identical arrangement of logs—at least in a portion of the image. Two corresponding images are mirrored to one another, and thus not exact copies, both fully and in portions of the image. To sort out duplicates it thus suffices to find two unique logs in the two images and compare the location of the logs in respect to each other (and possibly other logs). If the locations are the same, the images are duplicates and the image of the best quality is selected. Herein quality may refer to the number of logs properly identified or classified. If the locations are mirrored, the images are corresponding pairs and are both kept.

As discussed in the above, in some embodiments, the image processor 102 is further configured to receive the first load image 202 and the second load image 204 from a camera 308 arranged at one side of the load 302 for capturing the first load image 202, and then arranged at the other side of the load 302 for capturing the second load image 204. Notably, one camera 308 may be used to take the first load end image 202 from the first end and then reposition it to take the image of the second load image 204 from the second end. Additionally, the captured images are sent to the image processor 102 via a wired or a wireless interface. Moreover, a server may also be used in order to send the images from the camera 308 to the image processor.

Optionally, the apparatus comprises a first camera 304 arranged at one side of the load 302 for capturing the first load image 202, and a second camera 306 arranged at the other side of the load 302 for capturing the second load image 204. Notably, the camera may be one or a plurality of cameras, such as cameras 304, 306. Additionally, the cameras, such as the cameras 304, 306 may be two stationary cameras facing opposite directions for taking images of both the log ends. Moreover, the first camera 304 for taking first load images 202 and a second camera 306 for taking second load images 204.

Optionally, the first camera 310 is arranged at a first side of an entrance (or exit) to a wood harvesting site, and the second camera 312 is arranged at a second side of an entrance (or exit) to a wood harvesting site.

Referring again to FIG. 2, in some embodiments, the matched log end pairs are compared with a data base arrangement 212 containing prestored images and information regarding them. Moreover, the matched log ends are classified based on the information from the data base arrangement 212 and a match ID 214 is generated. By comparing both images a higher likelihood of making a positive identification is achieved.

The use of two images of log ends, may also be used to provide a higher quality image of a log end. This is especially useful as the wood harvesting industry is not a clean industry and log ends may often be defaced or obscuring the year-ring patterns and other characteristic in other ways.

Referring to FIGS. 4A-4D, there is shown exemplary implementation of various defaced log ends, in accordance with an embodiment of the present disclosure. In FIG. 4A, the log end is defaced with a cut 402. In FIG. 4B, the log end is defaced with dirt 404. In FIG. 4C, the log end is defaced with a label 406. In FIG. 4D, the log end is defaced with a combination of a cut 402, dirt 404, and label 406.

The apparatus and the method according to herein are also, in some embodiments, enabled to determine the quality of several logs several logs at once, based on a same image of for example a load, whereby a whole load may be analysed in a single image. In such an analysis, similarities between the logs may be identified and used to identify qualifiers of the logs that could otherwise have been missed. More details on this will be given in the below. Even if the description herein is sometimes language-wise focused on a single log, it should be noted that the analysis of the quality of logs is determined based on the individual log, but also taking the other logs into concern. The patterns identified for one log are thus also compared to other logs in some instances and embodiments. This is useful as the inventors have realized, as sometimes a defect (such as an indicator of a disease) is only partially visible in a single log, but if more logs in a same pile show the same partial indicators, a conclusion based on the whole pile may be taken. Especially as the same trees in the same areas have been subjected to the same environmental factors.

In some embodiments, the image processor 102 is configured to determine a first pattern 106 in the first end. The image processor 102 is configured to determine a second pattern 110 in the second end. Optionally, the pattern comprises a year-ring pattern. Herein, "year-ring pattern" refers to the new cells formed in the shape of concentric circles.

Additionally, year-ring patterns show the amount of wood produced during one growing season. Optionally, the pattern comprises a saw-cut pattern. Herein, "saw-cut pattern" 402 refers to angle, cuts, throws, teeth patterns, and the likes that got marked while cutting the tree using a saw. Additionally, the saw-cut 402 patterns may be used standalone while classification the logs or may be used in combination with the year-ring patterns. The image processor 102 is thereby configured to determine a characteristic 112 of the log based on the first pattern 106 and the second pattern 110.

Optionally, the image processor 102 is further configured to determine that there is a difference in the first pattern 106 and the second pattern 110, and in response thereto determine that the log has been subjected to a growth issue and determine that the characteristic indicates a quality factor.

Optionally, in this regard, the image processor 102 compares, at a step 210, the first end with the second end of the log images, such as the log images 104, 108. Additionally, the difference in the first end and the second of the log images indicates if the log is not uniform throughout the length thereof. Moreover, the processor determines a quality factor based on the difference identified. Notably, lesser the difference, the more uniform the log is and hence, better the quality of the log. Consequently, more the difference, indicates a non-uniform log and hence, lower the quality of the log.

Optionally, the image processor 102 is further configured to determine the difference based on: identifying the marrow in the first load image 202; identifying the marrow in the second load image 204; and determining the difference as the difference in a location of the tree marrow in the first load image 202 and a location of the marrow in the second load image 204. Optionally, in this regard, "marrow" refers to the centre of the log. Notably, the processor identifies the marrow in the first load image 202 of the first end and the marrow in the second load image 204 of the second end. Moreover, the difference in locations of the marrow in the first image and the marrow in the second image is determined. The difference identified suggests the quality factor and the growth issue of the log. Additionally, the location difference further suggests whether the log is skewed. Furthermore, the marrows in the both the images may also be compared among themselves. Additionally, the difference in the shape, size, and the likes of the marrows may also suggest the quality factor and the growth issue of the log.

Optionally, the image processor 102 is further configured to determine quality factor based on the difference, wherein a big difference indicates a low quality. Notably, the difference suggests that the log is not uniform throughout the length and is of lower quality. Additionally, the bigger the difference, the lower the quality of the log.

Optionally, the image processor 102 is further configured to determine that the characteristic indicates rot. Herein, the term "rot" refers to decomposition of the log by bacteria and/or fungi. Notably, the rot may be determined by the colour. Moreover, if the rot is clearly visible in one of the images, the corresponding second image is also checked. Furthermore, if the rot is found to be on both the sides of the log, the rot indicates that it has spread throughout the length of the log. Consequently, this further indicates a lower quality of the log. Moreover, rot found only in one of the images or on one end of the log may simply indicate a local rot. Consequently, a local rot may be removed later by chopping of the particular area. Additionally, local rots do not substantially affect the quality of the log.

Optionally, the image processor 102 is further configured to determine that the characteristic indicates at least one crack in the log. Notably, if the crack is found on both log ends, at the same corresponding locations, the crack indicates that it has travelled throughout the log. Consequently, this further indicates a lower quality of the log. Moreover, cracks found only in one of the images or on one end of the log may simply indicate a local crack. Consequently, a local crack may be removed later by chopping of the particular area. Additionally, local cracks don't affect the quality of the log much.

Optionally, the image processor 102 is further configured to determine that the characteristic indicates heartwood. Herein, "heartwood" refers to the dead, central wood of trees. Additionally, its cells usually contain tannins or other substances that make it dark in colour and sometimes aromatic. Moreover, heartwood is mechanically strong, resistant to decay, and less easily penetrated by wood-preservative chemicals than other types of wood. Furthermore, the heartwood is the older, harder, non-living central wood of trees that is usually darker, denser, less permeable, and more durable than the surrounding sapwood. Moreover, the ratio of the heartwood and splinters can also be calculated. Notably, the volume of the heartwood determines the quality and the value of the log.

Optionally, the characteristic indicates a skewed log and wherein the image processor 102 is further configured to: determine a first centre of the log in the first pattern 106; determine a second centre of the log in the second pattern 110; and determine that the log is skewed based on the first and second centres.

Optionally, in this regard, the processor 102 determines the first centre in the first pattern 106 of the first log end. Additionally, the processor 102 determines the second centre in the second pattern 110 of the second log. Moreover, on the basis of the determined centres, the processor 102 further determines whether the log is skewed or not. Herein, "skewed" refers to a distortion or asymmetry in the log ends. Additionally, if the centre of the first pattern 106 do not match the centre of the second pattern 110, the log may be skewed.

Optionally, the characteristic indicates a volume and wherein the image processor 102 is further configured to: determine a first outer circumference of the log based on the first pattern 106; determine a second outer circumference of the log based on the second pattern 110; and determine the volume based on a length of the log and the first and second circumference.

Optionally, the characteristic indicates a surface of wood excluding the bark and wherein the image processor 102 is further configured to: determine a first outer circumference of the log excluding the bark based on the first pattern 106; determine a second outer circumference of the log excluding the bark based on the second pattern 110; and determine the volume based on a length of the log and the first and second circumference.

Optionally, in this regard, the processor 102 determines the first and the second outer circumferences of the first pattern 106 and the second pattern 110 respectively. Notably in some embodiments, the actual volume is the wood inside the outer circumferences or inside the bark.

Additionally, to calculate the actual volume of the log, the length of the log is multiplied with the cross-sectional area. Furthermore, the actual volume of the pile or load may simply be calculated by summing up the volumes of the individual logs.

Optionally, the image processor 102 is further configured to determine the volume based on a length of the log and the smaller of the first and second circumference. Notably, to calculate the volume of the log, the length of the log is taken, and the smaller outer circumference is taken. Additionally, this generates the usable volume of the log.

Throughout the present disclosure, the term "data base arrangement" as used herein refers to storage of digital information, such as images related to a given log, regardless of the manner in which the digital information is represented. Optionally, the data base arrangement 212 is hardware, software, firmware and/or any combination thereof. In an example, the storage refers to a database system in the form of a table, a map, a grid, a packet, a datagram, files storage, a list or in any other form. The data base arrangement 212 includes any data storage software and systems, such as, for example, a server having a relational database.

As mentioned in the above, in some embodiments, the apparatus is operatively connected to a data base arrangement 212 comprising prestored patterns for logs, each pattern being associated with an individual log, and wherein the image processor 102 is configured to match at least one of the first load image 202 and second load image 204 to the plurality of pre-stored images to identify the individual log. Herein, the data base arrangement 212 stores images of log ends and/or patterns of logs. Notably, the prestored patterns for logs in the data base arrangement 212 may be stored as vectors. Moreover, apart from the patterns, the information regarding a particular pattern is also stored in the data base arrangement system. Additionally, the image processor uses both the first load image 202 and the second load image 204 for comparison, at a step 210. Furthermore, using two images increases the chances of getting a perfect match to identify individual logs.

The apparatus and the method according to herein are thus enabled to identify several logs at once, based on a same image of for example a load, whereby a whole load may be identified in a single image.

Optionally, the image processor 102 is configured to: determine which of the first load image 202 and second load image 204 shows the larger end of the log, and which of the first load image 202 and second load image 204 shows the smaller end of the log; determine that the matching prestored image is of the smaller end; and in response thereto replace the prestored image with the image which shows the larger end of the log.

This enables for a larger image to be used, which will more clearly show details.

Optionally, in this regard, the image processor 102 determines the smaller end and larger end of the logs based on the first log image 104 and the second log image 108. Additionally, match one of the images with the prestored images in the data base arrangement 212. Moreover, in case the matched prestored image is of the smaller end, the image processor 102 replaces the prestored image with the larger image. Notably, the smaller and the larger ends are determined based on the year-rings pattern and size of the logs. Moreover, the smaller end image is replaced with the larger end image because larger images provide better clarity and easier identification.

Optionally, the image processor 102 is configured to: store both the first load image 202 and the second load image 204 as a pair of images to be compared with in future comparisons. In such comparison a single image may be compared to the pair of images, or alternatively a pair of images may be compared to the stored pair of images. The comparison may be for identifying a log and/or for other determinations as discussed herein.

Referring to FIG. 5, there is shown an exemplary implementation of comparing two log ends, in accordance with an embodiment of the present disclosure. The image processor (not shown) compares, at a step 502, a first log end 504 with its corresponding second log end 506. Notably, the first log end 504 and the second log end 506 are defaced differently, such as cut 508 and dirt 510. Additionally, comparing, at a step 502, generates a matched log end 514 with more details. Moreover, the matched log end 514 is based on the year-ring patterns 512 of the first log end 504 and the second log end 506.

Optionally, the image processor 102 is configured to match the plurality of log images to identify corresponding pairs of log images, the corresponding pair of log images being of a same log of different ends, prior to comparing, at a step 502, at least one of the images in each of the identified corresponding pair of log images to the plurality of pre-recorded images in the data base arrangement 212 and/or prior to analysing the log(s) as regards quality (wherein logs may be analysed individually or in unison in order to detect similarities between the logs indicative of quality factors), wherein a pair is compared, at a step 502, pairwise to the reference images. Notably, the plurality of log ends are matched with its corresponding pair before comparing it to the data base arrangement 212. Additionally, this increases the likelihood of a successful match with the prestored images in the data base arrangement 212. Moreover, comparing, at a step 502, the log end pairs generate a more detailed image of the log end that can be further compared with the prestored image.

Figure 6:
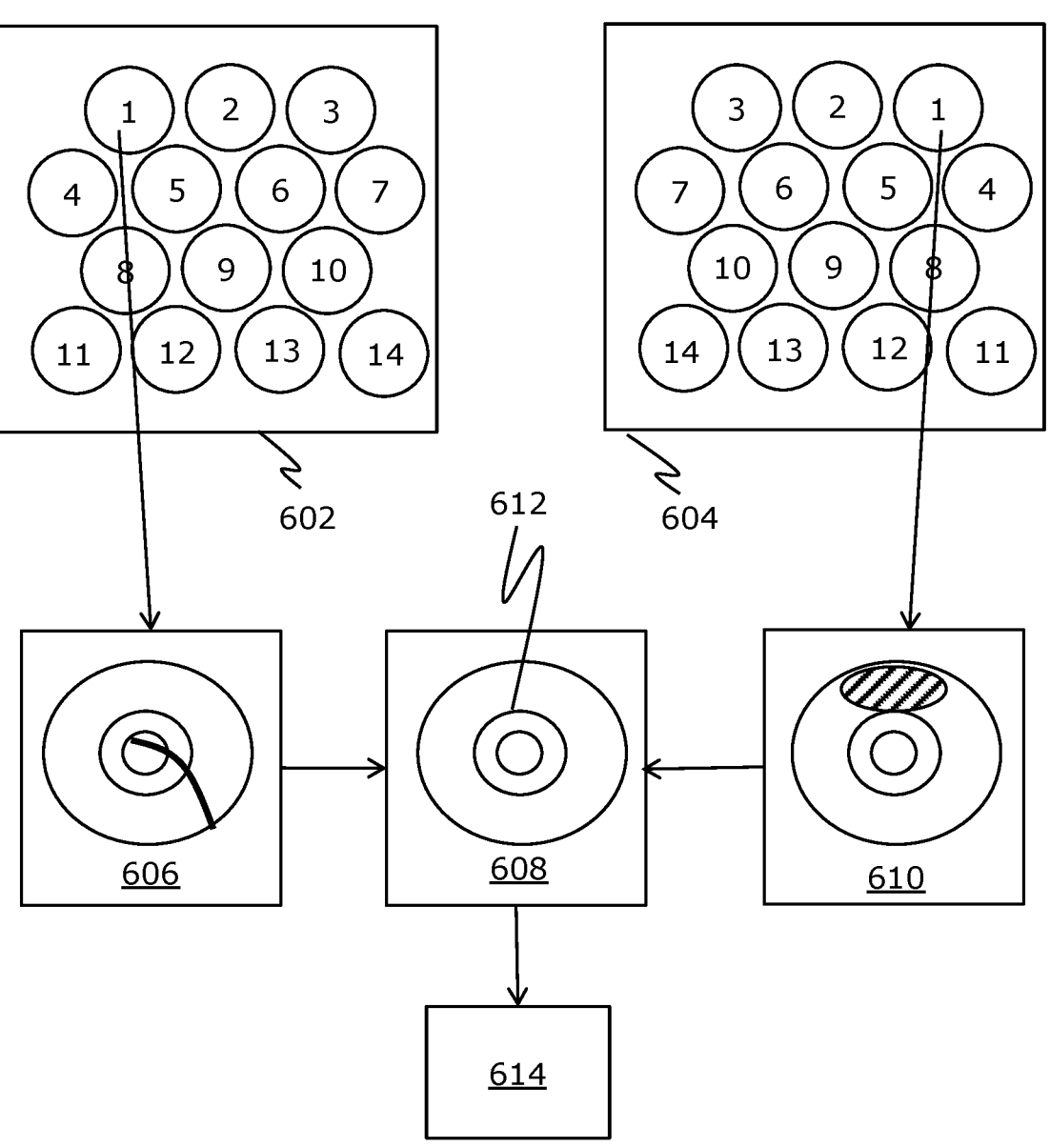
FIG. 6 illustrate an exemplary implementation to match corresponding log ends in a first load image and a second load image, in accordance with an embodiment of the present disclosure.

Referring to FIG. 6, there is shown an exemplary implementation to match corresponding log ends in a first load image 602 and a second load image 604, in accordance with an embodiment of the present disclosure. Notably, the logs in the load images lie in a pattern and are fairly straight and of a similar diameter along the length of the log. Additionally, there is a correspondence between the order of the log ends of the first load image 602 and the log ends of the second load image 604. Moreover, the second load image 604 appears to be the mirror of the first load image 602. The first log 606 from the first load image 602 is taken by the image processor (not shown) and is compared, at a step 608, with the corresponding mirrored log image 610 of the second load image 604. Additionally, the match is based on the year-ring patterns 612 and a successful match, at a step 614, confirms a pair of log ends.

Optionally, the image processor is configured to match the plurality of log images based on position of logs in the set of pile images. Notably, the logs lie in a pattern and are fairly straight and of a similar diameter along the length of the log. Additionally, there is a correspondence between the order of the log ends of the first load image 602 and the log ends of the second load image 604. Moreover, the second load image 604 appears to be the mirror of the first load image 602. Furthermore, first log 606 from the first load image 602 is taken and is compared, at a step 608, with the corresponding mirrored second load image 604. Additionally, the match is based on the year-ring patterns 612 and a successful match, at a step 614, confirms a pair of log ends.

Figure 7:
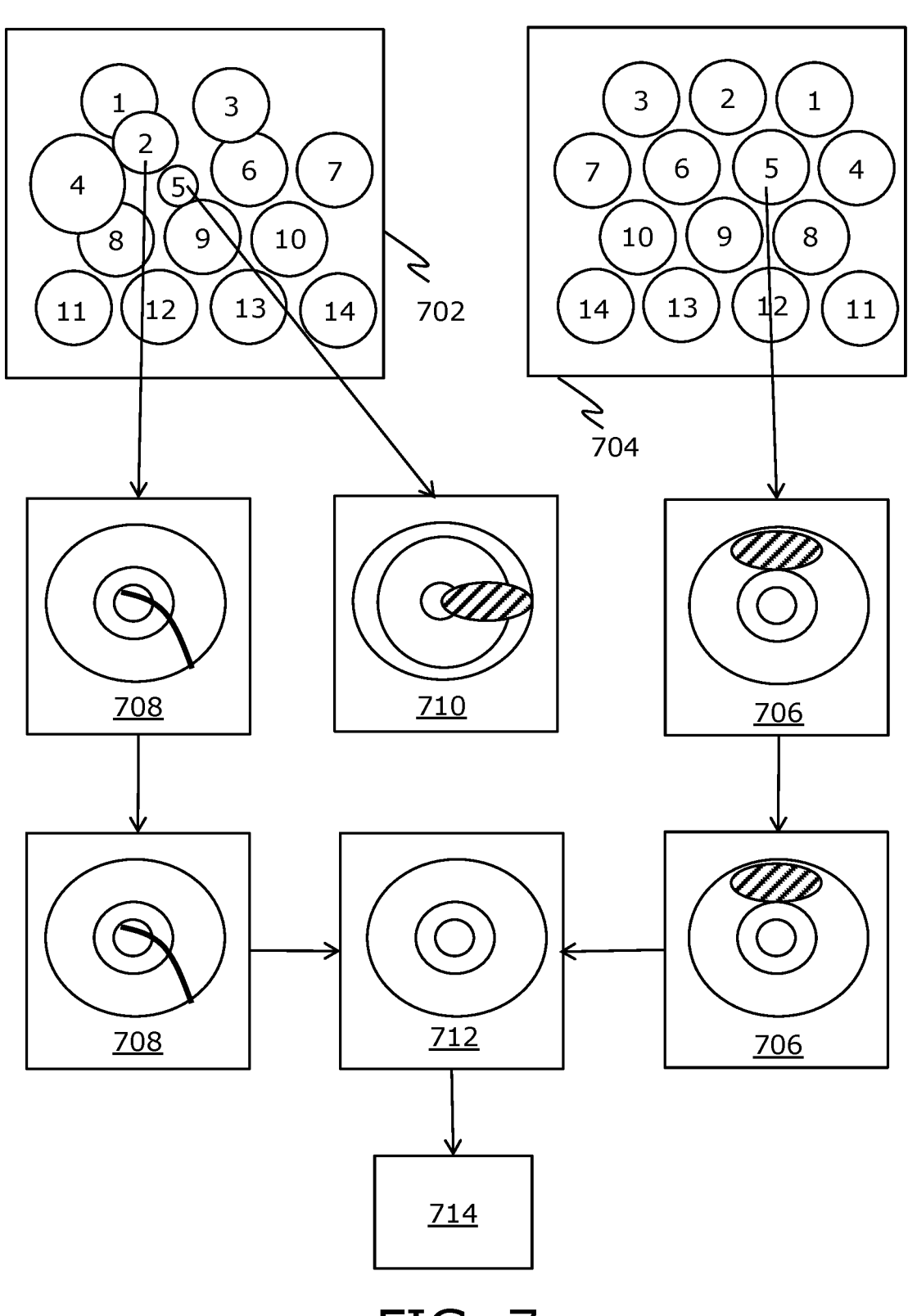
FIG. 7 illustrate an exemplary implementation to match corresponding log ends in a first load image and a second load image, in accordance with an embodiment of the present disclosure.

Referring to FIG. 7, there is shown an exemplary implementation to match corresponding log ends in a first load image 702 and a second load image 704, in accordance with an embodiment of the present disclosure. Herein, the logs may not be completely cylindrical, but may be of a differing diameter, and possibly also shape and may be even not straight. As a result, the logs may not be piled evenly and, for example the fifth log end 706 from the second load image

704 may correspond to the second 708 or the fifth log end 710 from the first load image 702. In some embodiments, the image processor (not shown) selects the most likely log end based on the position of the log. A weight is assigned based on ordinal number or on the basis of log distances from the expected position of the log, to the actual position of the log, counted in number of logs or in actual distance. A log at a corresponding position in the second load image will thus have a higher likelihood of being matched to the log being matched, than a log at a different position in the second load image. The second log end 708 of the first load image 702 is compared, at a step 712, with the fifth log end 706 of the second load image 704. Consequently, a successful match, at a step 714 is found.

Thus, to improve the matching of corresponding log end pairs, the log ends may be compared, at a step 712, to one another by selecting the most likely log ends as being corresponding log end pairs based on position and/or year-ring patterns (or other patterns). Furthermore, the comparison may also keep track of which log end pairs that have already been matched and not make further comparisons, at a step 712, based on the already matched logs or pairs of logs. As discussed in the above, the matching may be weighted based on the position of the log end in the plurality of log images. Additionally, the weight may be based on an ordinal number (i.e., the first or second log from the left in the first load image 702 being compared with the first log from the left in the possible pair load image). The weight may be set up so that a threshold for a successful match is increased if there is a difference in position. Moreover, weighting may be achieved by a lowered or raised threshold, or by multiplying the matching result with a factor. Furthermore, only the logs within a log or positional distance of 1, 2, 3 or 4 logs are compared. The weighting may, as discussed in the above, be determined based on the log distance. Additionally, log distance is the number of logs in between the log in question. Moreover, log distance may also be the actual distance (possibly normalized) with reference to the frame of the pile load image.

Figure 8A:
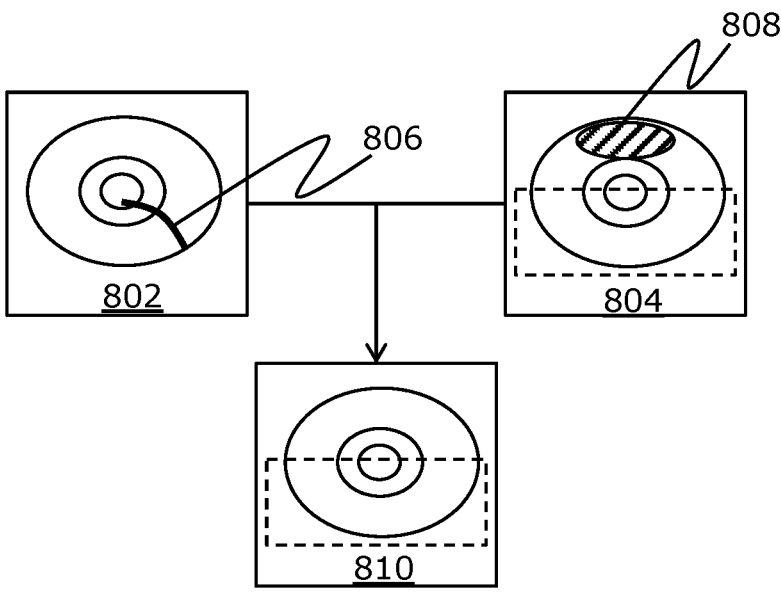
FIG. 8 illustrate an exemplary implementation to use a portion that is defaced in a first log end image with a corresponding portion of the second log end image, in accordance with an embodiment of the present disclosure.
Figure 8B:
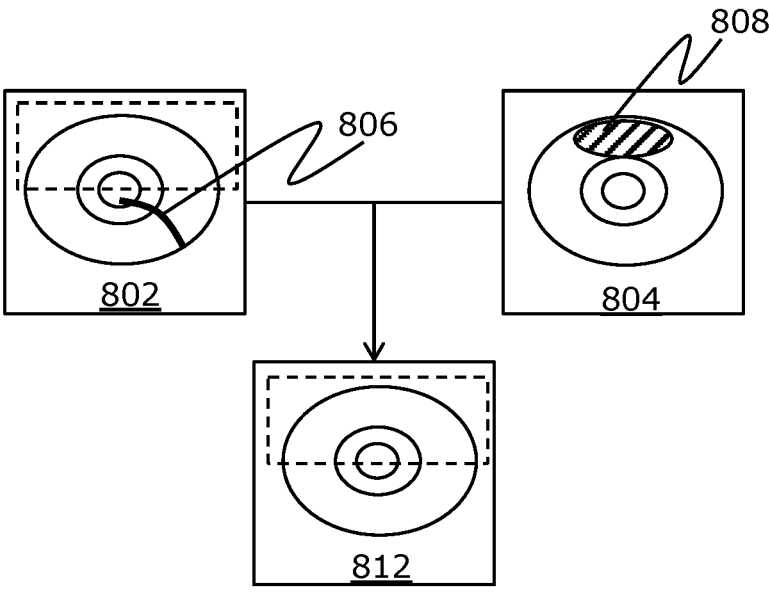

Referring to FIGS. 8A and 8B, there is shown an exemplary implementation to use a portion that is defaced in a first log end image 802 with a corresponding portion of the second log end image 804, in accordance with an embodiment of the present disclosure. In FIG. 8A, a first log end image 802 is defaced with a cut 806 and the second log end image 804 is defaced with dirt 808. Notably, a clean portion (shown with dotted lines) of the second end image 804 is used to supplement the defaced portion of the first log end image 802. Consequently, this provides a cleaner image 810 which is not defaced. In FIG. 8B, a first log end image 802 is defaced with a cut 806 and the second log end image 804 is defaced with dirt 808. Notably, a clean portion (shown with dotted lines) of the first log end image 802 is used to supplement the defaced portion of the second log end image 804. Consequently, this provides a cleaner image 812 which is not defaced.

Optionally, the image processor 102 is configured to use corresponding pairs of log images to supplement a defective portion present in a log image captured from a given end with undefective portion, such as undefective portions from the corresponding log image captured from the other end. Herein, a "defective portion" refers to defaced log end that makes it difficult to identify a pattern clearly. Additionally, a log end may be defaced by being dirty, damaged (a cut), a marking, a label attached to it, and the likes. Moreover, as the images of both the ends of a log may be defected differently, such as 806, 808 it increases the likelihood of having one of the log end images matching the prestored images in the data base arrangement 212. Notably, supplementation is to use a portion that is defaced in a first log end image 802 with a corresponding portion of the second log end image 804, where the portion is not defaced. Furthermore, the image processor 102 uses a defaced log end and its corresponding log end pair to get a successful match. Herein, the image processor uses the year-ring pattern to find a log end pair of a defaced log end.

This enables for an improved image, such as improved images 810, 812 of the ends to be compared to the prestored end, which enables for a larger likelihood of finding a match.

Optionally, the image processor 102 is configured to merge and use an average of the log images from the first end and its corresponding second end; wherein the produced merged image is void of defects or at least exhibiting less defects. Notably, the image processor 102 identifies the log end pair of a defaced log end using the year-ring patterns 512. Furthermore, the log and its pair may be defaced differently. Moreover, the image processor 102 merges the first defaced log end and its corresponding defaced log end pair. Notably, the merged log end image is free from any defects (clean) as the log ends are defaced differently. Additionally, patterns that are not part of year-ring patterns are removed. Moreover, common features are weighted or emphasized to become more prominent.

Optionally, the apparatus is configured to utilize an artificial intelligence module to identify the characteristic 112 based on the first pattern 106 and second patterns 110.

Optionally, the artificial intelligence module is a neural network. Herein, neural network may include, but is not limited to, deep learning, Convolutional Neural Network (CNN). Notably, neural networks, also known as artificial neural networks (ANNs) or simulated neural networks (SNNs), are a subset of machine learning and are at the heart of deep learning algorithms. Additionally, CNNs are powerful image processing, artificial intelligence (AI) that use deep learning to perform both generative and descriptive tasks, often using machine vison that includes image and video recognition, along with recommender systems. Moreover, a Convolutional Neural Network (CNN) is a Deep Learning algorithm which can take in an input image, assign importance (learnable weights and biases) to various aspects/objects in the image and be able to differentiate one from the other.

Optionally, the first pattern 106 and second patterns 110 includes year-ring patterns. Notably, the artificial intelligence uses the first pattern 106 and the second pattern 110 to determine the characteristics 112 of a log. Additionally, the artificial intelligence identifies year-ring patterns based on the number of year-rings, shape of the year-rings, location of the year-rings, distance between the year-rings.

Optionally, the first patterns 106 and second patterns 110 includes saw cut patterns. Herein, "saw-cut pattern" 402 refers to angle, cuts, throws, teeth patterns, and the likes that got marked while cutting the tree using a saw. Additionally, the saw-cut 402 patterns may be used standalone while classification the logs or may be used in combination with the year-ring patterns.

Optionally, the artificial intelligence module is trained based on the first patterns 106 and second patterns 110. Notably, the artificial intelligence module is trained using training data. Additionally, the training data is of patterns pertaining to first and second patterns of the log ends. Moreover, the artificial intelligence module is trained using supervised learning. Furthermore, while training, the artificial intelligence module is presented with information on which the images are matching and on the images that are not matching. Consequently, the artificial intelligence module starts learning the characteristics on the basis of which a successful match is triggered. Additionally, the artificial intelligence module learns to differentiate the matching images and the images that do not match. Furthermore, the parameters of comparing are saw-cut patterns 402, year-ring patterns, diameter of the log, shape and/or branching. Notably, the parameters may be used standalone or in combination. Furthermore, there might only be small differences in the year ring patterns, and hence, supplementing factors may be used to increase the likelihood of a successful and correct match. Moreover, as the log ends may be damaged or otherwise obscured at least partially such that a portion of the year-ring pattern is not clearly visible.

Optionally, the apparatus is configured to utilize an artificial intelligence module to identify the characteristic based on the first log images 104 and second log images 108. Herein, the "characteristics" refers to quality factor, tree marrow, rot, crack, heartwood, skew, volume, and the like.

Optionally, the image processor 102 is further configured to utilize the artificial intelligence module to identify the characteristic 112 based on one or more indicators in the first patterns 106 and second patterns 110, and in some embodiments, taking into account the indicators of other logs in the same load image.

Optionally, the image processor 102 is further configured to utilize the artificial intelligence module to identify the one or more indicators in the first patterns 106 and second patterns 110, optionally for more than one log at a time in order to identify similarities between the logs indicative of quality factors.

Optionally, the artificial intelligence module is trained to identify one or more indicators in the first patterns 106 and second patterns 110 and identify the characteristics 112 based on the one or more indicators.

Optionally, the image processor 102 is further configured to utilize the artificial intelligence module to also match the corresponding logs to provide the pairs of log images from the pile or load images.

Optionally, the artificial intelligence module is capable of performing any, some or all of the comparisons and mergers. Additionally, the artificial intelligence module keeps improving through machine learning, where the module learns how to best merge an image, what type of features to emphasize or diminish. Furthermore, the size of the log ends may be scaled by the artificial intelligence module before any comparison is made, as otherwise mergers or other image processing may be difficult.

It should be noted that "image" as used herein when it comes to storing and comparisons may relate to an image, a representation of an image, or a representation of a pattern determined in an image.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. An apparatus configured for classifying timber logs in a wood processing chain, wherein the apparatus comprises an image processor, wherein the image processor is configured to:

receive one or more first log image each of a first end of log;

receive one or more second log image of a corresponding second end of the same logs, wherein the second end is opposite the first end;

determine a first pattern in each of the first ends;

determine a second pattern in each of the second ends;

determine a characteristic for each log based on the corresponding first pattern and the second pattern, determine that the corresponding log has been subjected to a growth issue, determine that the characteristic indicates a quality factor, and determine the quality factor based on the difference, wherein a big difference indicates a low quality.

2. The apparatus according to claim 1, wherein the image processor is further configured to determine the difference based on:

a. identifying the marrow in the first image;

b. identifying the marrow in the second image; and c. determine the difference as the difference in a location of the tree marrow in the first image and a location of the marrow in the second image.

3. The apparatus according to claim 1 wherein the image processor is further configured to determine that the characteristic indicates rot.

4. The apparatus according to claim 1, wherein the image processor is further configured to determine that the characteristic indicates at least one crack in the log.

5. The apparatus according to claim 1, wherein the image processor is further configured to determine that the characteristic indicates heartwood.

6. The apparatus according to claim 1, wherein the characteristic indicates a skewed log and wherein the image processor is further configured to:

a. determine a first centre of the log in the first pattern;

b. determine a second centre of the log in the second pattern; and c. determine that the log is skewed based on the first and second centres.

7. The apparatus according to claim 1, wherein the characteristic indicates a volume and wherein the image processor is further configured to:

a. determine a first outer circumference of the log based on the first pattern;

b. determine a second outer circumference of the log based on the second pattern; and c. determine the volume based on a length of the log and the first and second circumference.

8. The apparatus according to claim 7, wherein the image processor is further configured to determine the volume based on a length of the log and the smaller of the first and second circumference.

9. The apparatus according to claim 1, wherein the image processor is further configured to receive the one or more first and one or more second log images by:

receiving a first load image and a second load image, wherein the first load image is an image of a load of logs from a first direction showing one end of the logs, and the second load image is an image of at least a portion of the load of logs in a second direction showing the opposite end of the logs;

segmenting each load image to obtain a plurality of log images, wherein each of the plurality of log images for the first load image comprises an image of a first end of at least one log and each of the plurality of log images for the second load image comprises an image of a second end of at least one log; and compare the plurality of log images for the first load to the plurality of log images for the second load based on year-ring patterns, whereby a matching pair of log images constitute a first and a second log image.

10. The apparatus according to claim 1, wherein the apparatus is operatively connected to a data base arrangement comprising prestored patterns for logs, each pattern being associated with an individual log, and wherein the image processor is configured to match at least one of the first and second images to the plurality of prestored images to identify the individual log.

11. The apparatus according to claim 10, wherein the image processor is configured to:

determine which of the first and second image shows the larger end of the log, and which of the first and second image shows the smaller end of the log;

determine that the matching prestored image is of the smaller end; and in response thereto replace the prestored image with the image which shows the larger end of the log.

12. The apparatus according to claim 10, wherein the image processor is further configured to receive the first load image and the second load image from a camera arranged at one side of the load for capturing the first load image, and then arranged at the other side of the load for capturing the second load image.

13. The apparatus according to claim 10, wherein the apparatus comprises a first camera arranged at one side of the load for capturing the first load image, and a second camera arranged at the other side of the load for capturing the second load image.

14. The apparatus according to claim 13, wherein the first camera is arranged at a first side of an entrance to a wood harvesting site, and the second camera is arranged at a second side of an entrance to a wood harvesting site.

15. The apparatus according to claim 10, wherein the image processor is configured to match the plurality of log images to identify corresponding pairs of log images, the corresponding pair of log images being of a same log of different ends, prior to comparing at least one of the images in each of the identified corresponding pair of log images to the plurality of pre-recorded images in the database arrangement, wherein a pair is compared pairwise to the reference images.

16. The apparatus according to claim 15, wherein the image processor is configured to match the plurality of log images based on position of logs in the set of pile images.

17. The apparatus according to claim 10, wherein the image processor is configured to use corresponding pairs of log images to supplement a defective portion present in a log image captured from a given end with undefective portion from the corresponding log image captured from the other end.

18. The apparatus according to claim 10, wherein the image processor is configured to merge and use an average of the log images from the first end and its corresponding second end; wherein the produced merged image is void of defects.

19. The apparatus according to claim 1 wherein the apparatus is configured to utilize an artificial intelligence module to identify the characteristic based on the first and second patterns.

\*   \*   \*   \*   \*